(12) United States Patent
Gu et al.

(10) Patent No.: US 7,767,256 B2
(45) Date of Patent: Aug. 3, 2010

(54) METHOD FOR PREPARING A POROUS INORGANIC COATING ON A POROUS SUPPORT USING CERTAIN PORE FILLERS

(75) Inventors: Yunfeng Gu, Painted Post, NY (US); Wei Liu, Painted Post, NY (US); Jianguo Wang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 417 days.

(21) Appl. No.: 11/880,066

(22) Filed: Jul. 19, 2007

(65) Prior Publication Data
US 2008/0299349 A1 Dec. 4, 2008

Related U.S. Application Data

(60) Provisional application No. 60/932,469, filed on May 31, 2007.

(51) Int. Cl.
*B32B 5/18* (2006.01)
*B05D 7/22* (2006.01)

(52) U.S. Cl. .................... 427/181; 428/316.6; 428/116; 427/215; 427/220; 427/222; 427/226; 427/137

(58) Field of Classification Search ........................ None
See application file for complete search history.

(56) References Cited

U.S. PATENT DOCUMENTS

| | | | |
|---|---|---|---|
| 4,412,921 A | 11/1983 | Leung et al. | |
| 4,711,719 A | 12/1987 | Leenaars et al. | 210/500.26 |
| 4,971,696 A | 11/1990 | Abe et al. | 210/500.25 |
| 5,120,576 A | 6/1992 | Goldsmith et al. | 427/245 |
| 5,143,614 A | 9/1992 | Soria et al. | |
| 5,415,775 A | 5/1995 | Castillon et al. | 210/490 |
| 7,049,259 B1 | 5/2006 | Deckman et al. | 502/4 |

FOREIGN PATENT DOCUMENTS

| | | | |
|---|---|---|---|
| CA | 1196873 | 11/1985 | |
| EP | 0391321 A2 | 10/1990 | |
| EP | 0320033 | 12/1991 | 71/2 |
| EP | 0524678 | 1/1993 | |
| FR | 2502508 | 10/1982 | |
| FR | 2549736 A1 | 2/1985 | |
| FR | 2678524 A1 | 1/1993 | |

OTHER PUBLICATIONS

Y.S. Kim et al., "Preparation of Continuous Mesoporous Silica Thin Film on a Porous Tube", Adv. Mater. vol. 14, pp. 1078-1081 (2002).
International Search Report and Written Opinion Of The International Searching Authority for PCT Application No. PCT/US2008/006793 filed May 29, 2008.

*Primary Examiner*—Ling Xu
(74) *Attorney, Agent, or Firm*—Steven J. Scott; Lisa M. Noni

(57) ABSTRACT

Methods for preparing porous inorganic coatings on porous supports using certain pore fillers, and porous supports coated with porous inorganic coatings. The porous inorganic coatings may serve as membranes useful in, for example, liquid-liquid, liquid-particulate, gas-gas, or gas-particulate separation applications.

24 Claims, 7 Drawing Sheets

METHOD FOR PREPARING A POROUS INORGANIC COATING ON A POROUS SUPPORT USING CERTAIN PORE FILLERS

This application claims the benefit of priority to provisional application No. 60/932,469, titled "Method for Preparing a Porous Inorganic Coating on a Porous Support Using Certain Pore Fillers," filed on May 31, 2007, the contents of which are incorporated by reference herein.

FIELD OF THE INVENTION

The invention relates to methods for preparing porous inorganic coatings on porous supports using certain pore fillers, and to porous supports coated with porous inorganic coatings. The porous inorganic coatings may serve as membranes useful in, for example, liquid-liquid, liquid-particulate, gas-gas, or gas-particulate separation applications.

BACKGROUND

An inorganic membrane may be applied, for example, as a porous coating on a porous ceramic support. Inorganic membranes offer several advantages over organic membranes. Inorganic membranes, for example, typically have high chemical and thermal stabilities that allow the membranes to be used in extreme pH and chemical environments. In addition, inorganic membranes can be easily cleaned by applying high temperature treatments such as firing.

Inorganic membranes may be used for filtration and separation applications in the environmental, biological, food and drink, semiconductor, chemical, petrochemical, gas and energy industries. These industries often require purified gas/vapor or purified liquid whose source is a mixed feed stream composed of different gas and/or liquid/particulate combinations. Specific examples include purification and separation of hydrogen gas, sequestration of carbon dioxide gas, filtration of oil/water mixtures, wastewater treatment, filtration of wines and juices, filtration of bacteria and viruses from fluid streams, separation of ethanol from biomass, and production of high purity gas and water for the semiconductor and microelectronics industry.

In the fabrication of an inorganic membrane, the porous inorganic coating layer or layers can be prepared, for example, by dipping a ceramic support into a coating slip. The coated ceramic support is subsequently withdrawn from the slip and is dried and fired. In order to obtain high flux and separation efficiency in the inorganic membrane, the pore size of the support should be as large as possible (e.g., to maximize flux), while the coating layer thereon is desirably made from inorganic particles as small as possible (e.g., to form small pores with separation or filtration functions to maximize separation efficiency). However, effectively covering large pores on a support surface with small particles can be difficult. For example, during conventional coating processes, cracks and pin-holes can be formed in the coating layer as a result of the inorganic particles partly filling pores in the support. In addition, during conventional coating processes, the coating particles tend to penetrate into the support pores instead of forming a continuous layer on the support. Particle penetration is more severe for supports with broader pore size distributions. The foregoing problems can have a negative impact on separation efficiency.

In an effort to minimize these problems, some processes include application of multiple coating layers of inorganic particles, wherein application of layers with large particles is followed by application of layers with gradually smaller particles, layer by layer. However, this process can often be inefficient in that it requires an undue number of multiple coating steps, especially when the pores of the support are more than 5 μm in size. Moreover, these multilayer coating layers may produce thick and rough layers, which can be undesirable.

Other processes attempt to modify the support surface prior to coating the surface in an effort to minimize cracks and pin-holes. For example, some processes may saturate the support with water, or with acetone as discussed in U.S. Pat. No. 4,412,921, before coating with inorganic particles. One problem with these processes is that the liquid (i.e., water or acetone) can still draw the inorganic coating materials into the pores of the support. Yet another process discussed in Kim et al., Advanced Materials, 14 (15), 2002 (1078-1081) involves pretreating a ceramic support with polyvinyl alcohol (PVA) solution. The membranes prepared from such a process still comprise pin-holes, and have discontinuous structures when the support contains pores of more than 5 μm. Processes discussed in EP 0 320 033 A1 and EP 0 524 678 A1, similarly involve techniques for modifying supports before application of inorganic coatings.

In view of the above, there is a need in the art for more favorable processes for depositing membranes of relatively small inorganic particles on supports having relatively large pore sizes or pore size distributions.

SUMMARY OF THE INVENTION

The invention relates to methods for preparing porous inorganic coatings on porous supports using certain pore fillers (i.e., pore-fillers that fill pores of the porous support before application of the inorganic coating), and to porous supports coated with porous inorganic coatings. A method of the invention comprises:

providing a porous support comprising a first end, a second end, and a plurality of inner channels having surfaces defined by porous walls and extending through the support from the first end to the second end;

modifying the inner channel surfaces of the support by applying to the inner channel surfaces a composition comprising an organic pore-filling material selected from protein particles, starch particles, synthetic polymer particles, and combinations thereof;

applying to the modified inner channel surfaces a coating comprising inorganic particles; and heating the coated support to remove the organic pore-filling material, leaving a porous inorganic coating on the porous support.

One example composition comprising an organic pore-filling material is skim milk, which comprises protein particles.

This and additional features provided by embodiments of the present invention will be more fully discussed in the following detailed description.

Figure 1:
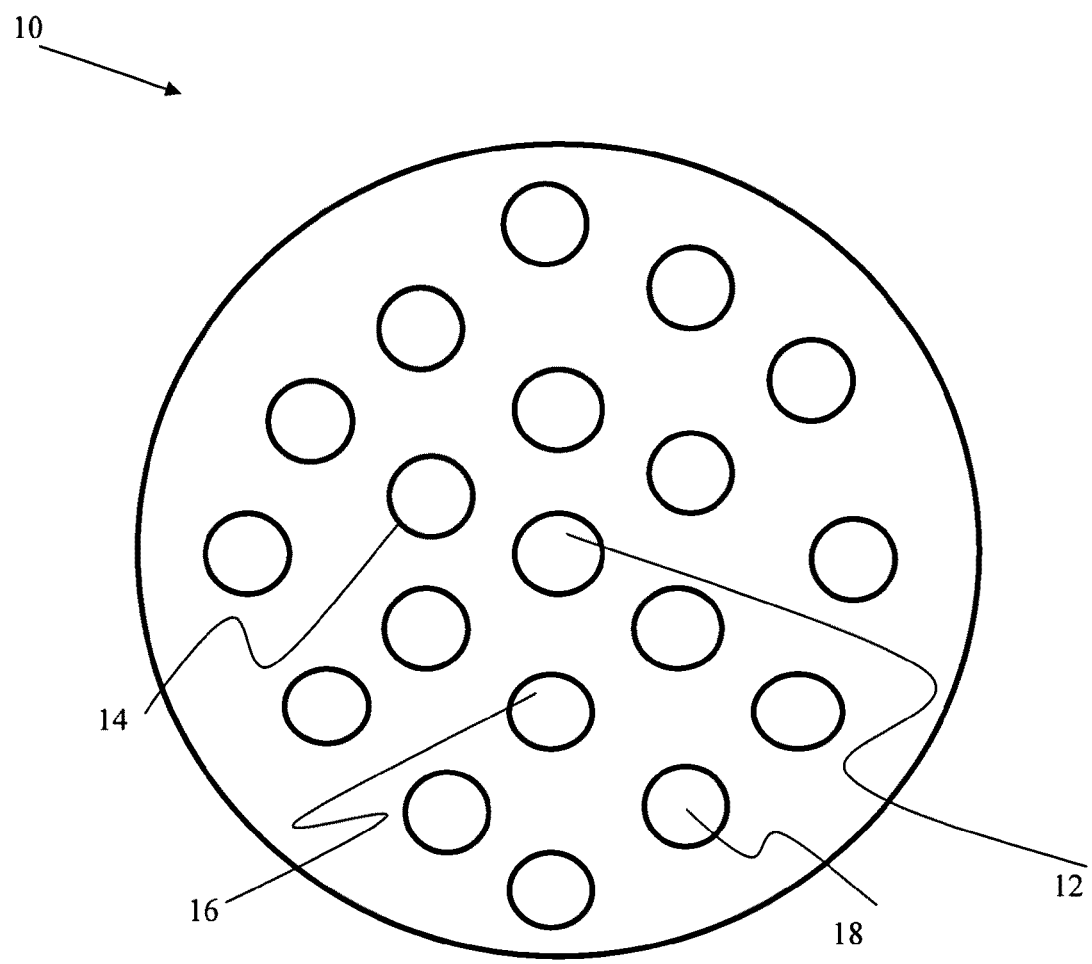
FIG. 1 is a schematic of a multi-channel porous support useful in an embodiment of the invention.

The embodiments set forth in the figures are illustrative in nature and not intended to be limiting of the invention defined by the claims. Moreover, individual features of the drawings and the invention will be more fully discussed in view of the detailed description.

DETAILED DESCRIPTION OF THE INVENTION

An embodiment of the invention is a method for preparing a porous inorganic coating on a porous support, which comprises:

providing a porous support comprising a first end, a second end, and a plurality of inner channels having surfaces defined by porous walls and extending through the support from the first end to the second end;

modifying the inner channel surfaces of the support by applying to the inner channel surfaces a composition comprising an organic pore-filling material selected from protein particles, starch particles, synthetic polymer particles, and combinations thereof;

applying to the modified inner channel surfaces a coating comprising inorganic particles; and heating the coated support to remove the organic pore-filling material, leaving a porous inorganic coating on the porous support.

The porous support used in the invention may be in the form of, for example, a honeycomb monolith. The method of the invention works advantageously well in depositing membranes within honeycomb channels of small diameter. The porous support, such as a honeycomb monolith, could have a channel density of, for example, from 50 to 600 cells per square inch. Example honeycomb monolith supports are disclosed in U.S. Pat. Nos. 3,885,977 and 3,790,654, the contents of both being incorporated by reference herein.

To allow for more intimate contact between a fluid stream flowing through the support and the coated support itself, for example when used in a separation application, it is desired in certain embodiments that at least some of the channels are plugged at one end of the support, while other channels are plugged at the other end of the support. In certain embodiments, it is desired that at each end of the support, the plugged and/or unplugged channels form a checkerboard pattern with each other. In certain embodiments, it is desired that where one channel is plugged on one end (referred to as "the reference end") but not the opposite end of the support, at least some, for example a majority, of the channels (preferably all of the channels in certain other embodiments) immediately proximate thereto (those sharing at least one wall with the channel of concern) are plugged at such opposite end of the support but not on the reference end. Furthermore, individual supports such as honeycombs can be stacked or housed in various manners to form larger supports having various sizes, service duration, and the like, to meet the needs of differing use conditions.

In one embodiment, the support is an inorganic material. Suitable porous inorganic support materials include ceramic, glass ceramic, glass, metal, clays, and combinations thereof. Some example materials include cordierite, mullite, clay, magnesia, metal oxides, talc, zircon, zirconia, zirconates, zirconia-spinel, magnesium alumino-silicates, spinel, alumina, silica, silicates, borides, alumino-silicates, e.g., porcelains, lithium aluminosilicates, alumina silica, feldspar, titania, fused silica, nitrides, borides, carbides, e.g., silicon carbide, silicon nitride or combinations of these.

In view of the above, the porous inorganic support could be a ceramic, such as cordierite, alumina (such as alpha-alumina), mullite, aluminum titinate, titania, zirconia, ceria or combinations thereof.

In one embodiment, the porous support is an alpha-alumina support as disclosed in co-pending U.S. Application No. 60/874,070, filed on Dec. 11, 2006, and titled "Alpha-Alumina Inorganic Membrane Support and Method of Making the Same," the contents of which are incorporated by reference herein. The support can be made, for example, according to a process comprising:

combining 60 weight % to 70 weight % α-alumina comprising a particle size in the range of 5 μm to 30 μm, 30 weight % of an organic pore former comprising a particle size in the range of 7 μm to 45 μm, 10 weight % of a sintering aid, and other batch components such as crosslinker, etc., to form a batch;

mixing the batch and allowing it to soak for 8 hours to 16 hours;

shaping a green body by extrusion; and sintering the green body by heating the green body at a temperature of at least 1500° C. for 8 hours to 16 hours.

In another embodiment, the support can comprise an organic material, such as a phenolic resin. In any event, the support structure should have adequate thermal stability so that it maintains a useful shape upon application of heat when carrying out the methods of the invention.

The porous support "provided" according to the invention may be a unitary structure, such as a bare ceramic support. In another embodiment, the porous support "provided" according to the invention may comprise a unitary structure, such as a ceramic support, already coated with a porous material that defines the porous walls of the inner channels of the support. That pre-existing coating may be, for example, one or more coatings of inorganic particles, such as alpha-alumina particles. Thus, in that embodiment, the method of the invention is carried out beginning with a coated support and results in the deposition of a further coating of inorganic particles placed over the previous coating. That embodiment may be carried out, for example, to ultimately deposit a coating of inorganic particles of a smaller median diameter over a pre-existing layer of inorganic particles having a larger median diameter. Such a result may be obtained, for example, by applying both coatings using methods according to the invention in series, e.g., using the method of the invention to apply a first coating to a bare support, then using the method of the invention to apply a further coating. Alternatively, the further coating can be applied according to the method of the invention, irrespective of the process used to deposit the first coating on the bare support.

Referring to FIG. 1, an exemplary multi-channel porous support 10 is illustrated. In this embodiment, the porous support 10 is a multi-channel structure, in particular a cylindrical structure (length not illustrated), comprising a plurality of inner channels 12 defined by porous walls 14 throughout its cross-section. In this and other embodiments, the inner channels of the support can be circular and have an average diameter of, for instance, from 0.5 to 10 mm, for example from 0.5 to 2 mm. The length of the support may be selected in view of its particular application. For example, the support may have a length of 80 mm or more, for example 100 mm, 150 mm or 200 mm or more. On a larger scale, the support may have a length of 0.5 m or more, or 1.0 m or more.

The invention can be applied to supports having a wide range of porosities and pore sizes on the porous walls that define the inner channel surfaces of the provided support. In one embodiment, the pores of the porous walls of the support have a median pore size of 5 µm or greater. In other embodiments, the pores of the porous walls of the provided support have a median pore size of from 0.5 to 100 µm, for example from 0.5 to 10 µm, or from 5 to 15 µm.

The inner channel surfaces of the support are modified by application of a composition comprising an organic pore-filling material selected from protein particles, starch particles, synthetic polymer particles, and combinations thereof. The pore-filling material fills relatively large support pores to reduce penetration of the subsequent inorganic coating into the support pores. The pore-filling material also smoothens the deposition surface of the support so that a more uniform inorganic coating can be made.

In one embodiment, the organic pore-filling material comprises protein particles. Protein particles may be supplied, for example, by applying to the inner channel surfaces a composition that is an aqueous suspension of protein particles. One example of such a composition is skim milk. In another embodiment, the organic pore-filling material comprises starch particles, such as amaranth starch (for example, having a mean diameter of 1.5 µm), quinoa starch (for example, having a mean diameter of 1.8 µm), taro starch (for example, having a mean diameter of 2.8 µm), or combinations thereof. In yet another embodiment, the organic pore-filling material comprises synthetic polymer particles, such as polystyrene, polyacrylate, an oligomer, or combinations thereof. Example oligomers include polyolefins having a molecular weight of 5000 daltons or less.

The particle size of the organic pore-filling material can be selected depending on the characteristics of the support, such as its pore size or pore size distribution, and on the characteristics of the inorganic particles that will be subsequently applied, such as their particle size. For example, the organic pore-filling material may comprise particles having a median particle size of from 0.1 to 3 µm.

Before application of the organic pore-filling material, external portions of the porous support 10 (i.e., the non-coating portions) may be covered at least partially prior to the modification step. For a support as shown in FIG. 1, the non-coating portions may comprise the non-channel regions of the support 10, such as the exterior surface of the cylinder. The covering material may comprise any removable medium effective to cover the non-coating regions of the porous support 10, for instance polytetrafluoroethylene tape. After the application of the organic pore filler and before the coating with inorganic materials, the tape can be removed from the modified porous support. The final properties of the coated porous support may be improved by leaving the tape on while the porous support dries after application of the organic pore-filling material.

The composition comprising the organic pore-filling material may be applied to the inner channel surfaces of the support through various methods. For example, a composition comprising the pore-filling material may be applied via dip coating, flow coating, slip-casting, immersion, or combinations thereof. Using these methods, the pore-filling material is transported from a fluid medium onto the channel walls and deposited on the wall surfaces. In one embodiment, the composition is applied as a coating slip on the porous support while the provided support is mounted inside a flow coater illustrated in FIG. 9. Once the composition has been applied to the support, the support may then undergo further treatment prior to coating with the inorganic particles. For instance, the porous support may be dried, for example for 20-24 hours under ambient conditions.

A coating comprising inorganic particles is then applied to the modified inner channel surfaces of the support. A wide variety of inorganic particles may be used, including but not limited to cordierite, alumina (such as alpha-alumina and gamma-alumina), mullite, aluminum titinate, titania, zirconia, and ceria particles and combinations thereof. The size of the inorganic particles may be selected depending, for example, on the pore size of the underlying modified support. For instance, the inorganic particles may have a median particle size of from 0.1 to 10 µm.

The coating comprising inorganic particles may be applied, for example, by contacting the modified inner channel surfaces with a composition comprising the inorganic particles. Such a coating composition may comprise, for instance, from 0.1 to 50 wt. % of inorganic particles. Generally speaking, higher inorganic particle concentrations tend to produce a thicker, more viscous slip, which in turn tends to produce a thicker coating on the support. The coating composition may also comprise, for example, a dispersant, a binder, an anti-cracking agent, an anti-foam agent, or combinations thereof, and may comprise an aqueous or organic carrier and be in the form of a slurry or suspension.

The coating composition comprising inorganic particles may also itself comprise protein particles, starch particles, or synthetic polymer particles that would serve as pore forming materials in the inorganic coating and would be removed later by heat, for example by calcining.

The coating comprising inorganic particles may be applied, for example, by dip coating, flow coating, slip casting, immersion, or combinations thereof. Using these methods, membrane materials are transported from a fluid medium onto the channel walls and deposited on the wall surfaces, leaving an intact deposition layer after the fluid is discharged.

Figure 9:
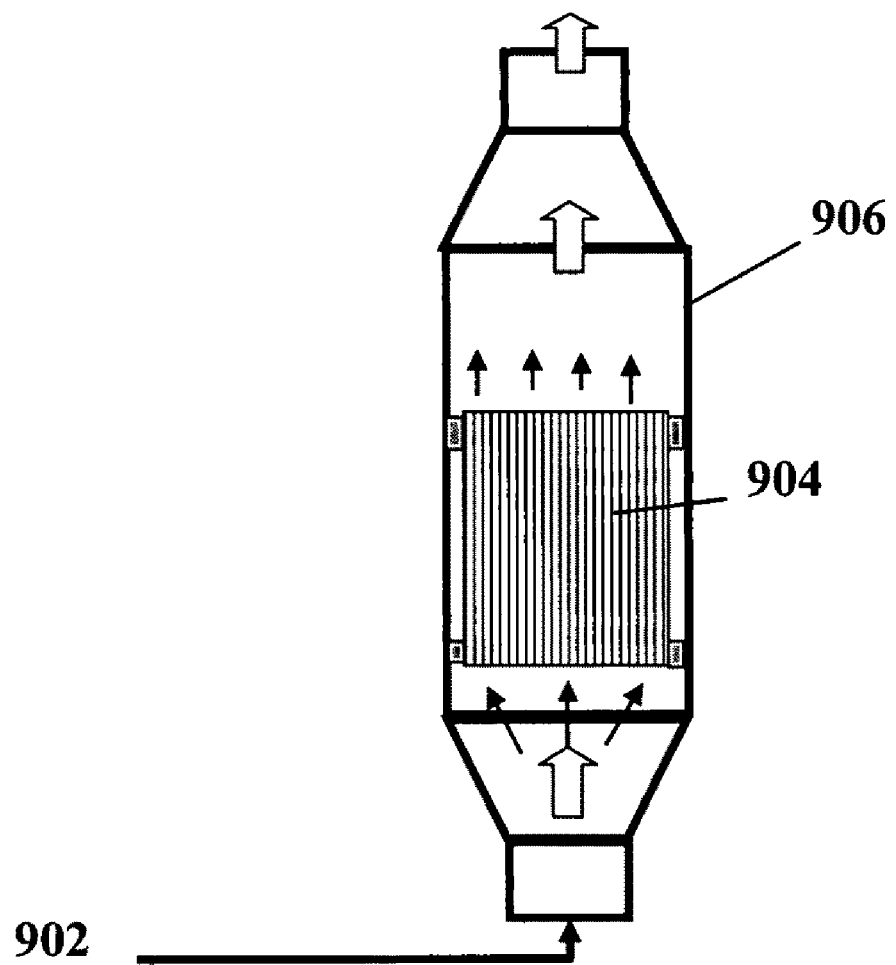
FIG. 9 is a schematic of a flow coating process and apparatus useful in an embodiment of the invention.

In one embodiment, the coating is deposited as a coating slip on the porous support while the provided support is mounted inside a flow coater illustrated in FIG. 9, as discussed in co-pending U.S. application Ser. No. 11/729,732, filed on Mar. 29, 2007, and titled "Method and Apparatus for Membrane Deposition," the contents of which are incorporated by reference herein. This technique includes providing a liquid precursor comprising membrane-forming materials to the support and applying a pressure differential across the support. The pressure differential causes the liquid precursor to travel uniformly through the channels, depositing the membrane-forming materials on the walls of the channels and forming the membrane on the walls of the through-channels. An apparatus useful for those techniques, illustrated in FIG. 9, includes an inlet that uniformly distributes a liquid precursor coating solution 902 to a monolith support 904, such as a monolith having a honeycomb structure, a chamber 906 capable of holding the support and maintaining a pressure differential across the plurality of through-channels, and an outlet. As mentioned above, this technique may be used to apply the composition comprising the pore-filling material to the support and/or to apply the coating comprising inorganic particles to the support.

The thickness, texture, and uniformity of the deposited membrane films may be controlled by process conditions. It will be apparent that the process conditions that are actually employed in the deposition of such membrane films depend on the nature of the membrane film and the liquid precursor, as well as other variables. For example, the linear velocity of the liquid precursor through the plurality of through-channels affects the hydrodynamics and mass transport of the liquid precursor onto the walls of the plurality of through-channels. In one embodiment, the liquid precursor flows through the plurality of through-channels at a predetermined linear velocity.

The resulting coated support may then be dried under a variety of conditions. For example, the coated support may be dried for 15-25 hours at room temperature or higher up to 120° C. in an air or nitrogen atmosphere. Drying may also be conducted under conditions of 60-90% humidity. The drying step, in one embodiment, is carried out in a controlled gas environment. The controlled gas environment is one in which the content of at least one of oxygen and water content is controlled. The oxygen content of the controlled atmosphere is typically kept to a minimum.

The coated support is then heated, for example fired, to remove the organic pore-filling material, leaving a porous inorganic coating on the underlying porous support. During the same or different heating step, the inorganic particles in the porous inorganic coating can be sintered. In one embodiment, the support may be fired at 900° C. to 1500° C. for a period of from 0.5 to 10 hours in a controlled gas environment at a heating rate of, for example, 0.5-2° C./min. In another embodiment, the firing process can be executed for 20-45 hours at 1100-1300° C. in air or in a mixture of nitrogen and oxygen. In yet another embodiment, the coated support is heated to calcinate the organic pore-filling material, for example at a temperature of 600° C. or more, then fired at a higher temperature to achieve sintering of the inorganic particles.

In one embodiment, the resulting sintered porous inorganic coating has a thickness of from 1 to 25 μm throughout the length of the inner channels, which could be throughout a length of 80 mm or more. The thickness of the coating can be increased by simply repeating the application of the same size particles in additional coating steps of the inorganic coating.

The pore size of the inorganic coating can be selected through appropriate choice of, for example, the inorganic particle size and sintering conditions. In one embodiment, the sintered inorganic coating has a median pore size of from 0.1 to 2 μm.

A further embodiment of the invention is a porous inorganic coating on a porous ceramic support, which is made by the method of the invention. Yet another embodiment is a coated porous support, which comprises:

a porous support comprising a first end, a second end, and a plurality of inner channels having surfaces defined by porous walls having a median pore size of X μm and having a length extending through the support from the first end to the second end; and a coating of inorganic particles having a median particle size of Y μm coating the surfaces of the inner channels of the provided porous support;

wherein the ratio X/Y≧1, for example ≧3 or ≧4; and wherein the layer of inorganic particles provides a continuous coating throughout the circumference and length of the inner channels of the porous support.

The coatings on the supports may be used as inorganic membranes suitable for liquid filtration and gas separation applications. The separations could be achieved by passing the gas or liquid stream through channels of the porous coated support to effect the desired separation. The coatings can also be applicable to automotive catalytic products and diesel particulate filter products.

For membrane filtration or separation applications, the methods described herein can provide direct deposition of coatings with small pores on a porous support with large pores, while reducing coating thickness, and thereby reducing costs and enhancing the permeation flux. For catalytic applications, the methods described herein can enable deposition of a uniform, thin layer catalyst on a porous support and minimize penetration of the catalyst material into the support pores, thereby resulting in better catalyst utilization, significant cost saving in the precious metal catalyst as well as reduced heating costs. The coated supports may furthermore be used as intermediate structures in processes that deposit additional membranes on the coated supports. Accordingly, it will be understood that the methods described herein can be used to manufacture membranes for use in a variety of applications.

COMPARATIVE EXAMPLE

Deposition of Alpha-Alumina on Supports without the Use of Pore-Fillers

This example describes the coating of alumina membranes on a porous monolith support without modification of the support before coating. A monolith support used in this example is made of alpha-alumina with an outer diameter of 8.7-9.2 mm and a length of approximately 150 mm comprising 19 rounded channels of an average diameter of 0.75 mm being uniformly distributed over the cross-sectional area. The support has a median pore size of 10.0 μm and porosity of 57.8%, as measured by mercury porosimetry. The support was flushed through the channels with deionized ("D.I.") water, then fully dried at 120° C. overnight.

Two alumina slips with a solid concentration of 30 wt. % and a PEG (polyethylene glycol) concentration of 4 wt. % were prepared using alumina materials of different particle sizes (AA-3 and C701, Sumitomo Chemical Co.). The alumina AA-3 has a narrow particle size distribution with a median particle size of 2.7-3.6 μm, while the alumina C701 has a broad size distribution with a median particle size of 6.3 μm. First, 0.16 g of Tiron (4,5-Dihydroxy-1,3-benzenedissulfonic acid disodium salt) was added into a 150 ml plastic jar with 100 g D.I. water, to which 80 g alumina powder was then added. Upon shaking for around 1 minute, the jar was put into an ice bath and ultrasonicated 30 times with 10 sec ON and 30 seconds OFF intervals. Next, the treated slip was mixed with 52.78 g D.I. water, 38.89 g 20 wt % PEG and 2.80 g 1% DCB (1,2-dichlorobenzene). After ball-milling for 15-20 hours, the slip was poured through a fine screen into a flask, followed by degassing with a vacuum pump.

The alumina coatings were placed inside the channels of the monolith support using a flow-coater illustrated in FIG. 9. The soaking time was 20 seconds. The coated support was spun for 40 seconds at a speed of 525 rpm to remove excess alumina slip in the channels, dried at 120° C. for 2 hours, and fired at 1400° C. for 2 hours at a heating rate of 1° C./min.

Figure 2A:
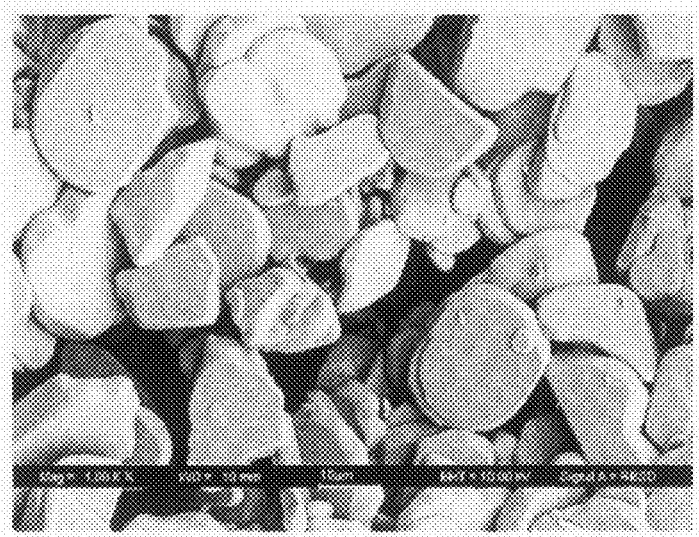
FIGS. 2a-2c are scanning electron microscope (SEM) images illustrating the surface morphologies of a bare monolith support (FIG. 2a), the monolith support coated with AA-3 alumina particles (FIG. 2b), and the monolith support coated with larger C701 alumina particles (FIG. 2c).
Figure 2B:
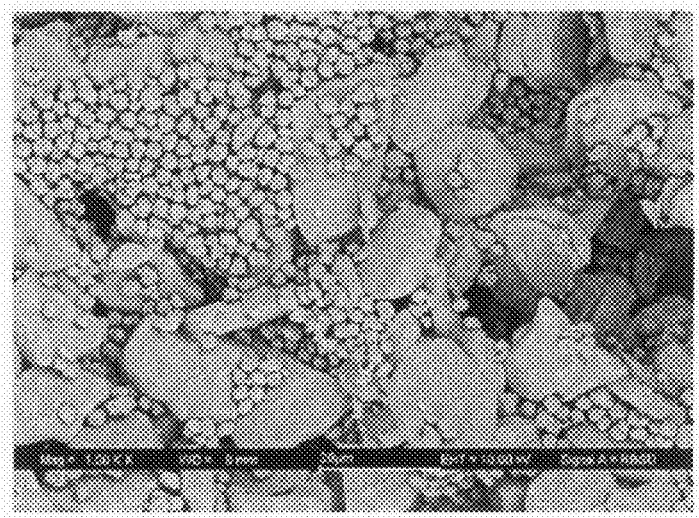
Figure 2C:
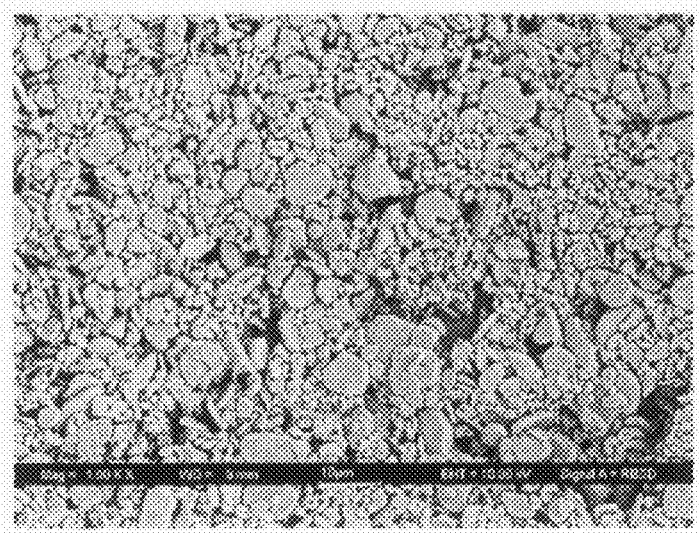

FIGS. 2a-2c are scanning electron microscope (SEM) images illustrating the surface morphologies of the bare monolith support (FIG. 2a), the monolith support coated with AA-3 alumina particles (FIG. 2b), and the monolith support coated with larger C701 alumina particles (FIG. 2c). FIG. 2a shows that some pores of the uncoated porous ceramic support are as large as 20-30 μm, although the median pore size is 10 μm, using Hg porosimetry. FIG. 2b shows no formation of a membrane on the support when the alumina (AA-3) of median particle size of approximately 3 μm was used, due to the fact that the small alumina particles penetrated into pores of the support. As shown in FIG. 2c, a continuous membrane was only formed when large alumina particles (C701) were used.

EXAMPLE 1

Deposition of an Alpha-Alumina Membrane on a Support Modified with Protein from Skim Milk This example describes the coating of an alumina membrane on a support modified with skim milk. The same alumina support was used as in the Comparative example. The coating process was also the same except for addition of a modification process before the slip-casting of the alpha-alumina membrane.

Figure 3A:
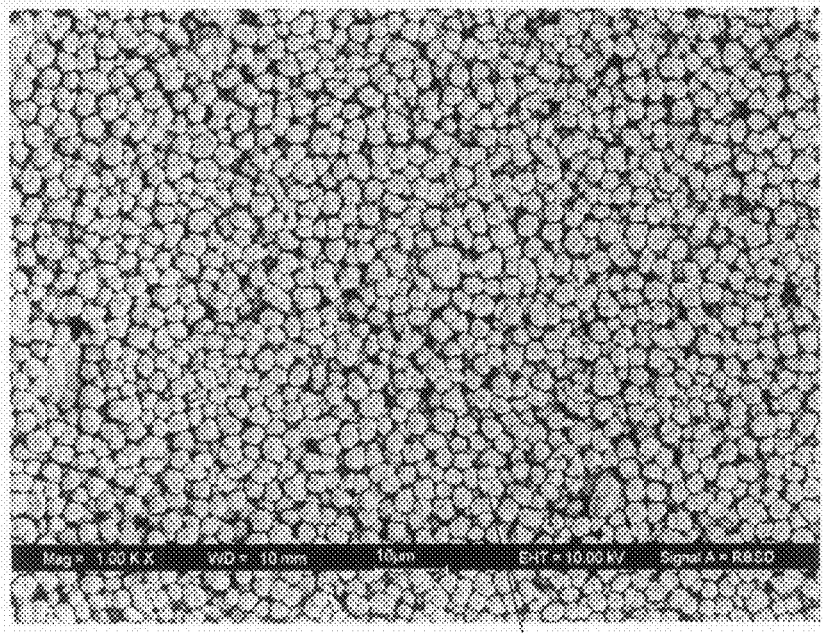
FIGS. 3a and 3b are SEM images illustrating the surface morphology (FIG. 3a) and the cross section (FIG. 3b) of a coated support according to an embodiment of the invention.
Figure 3B:
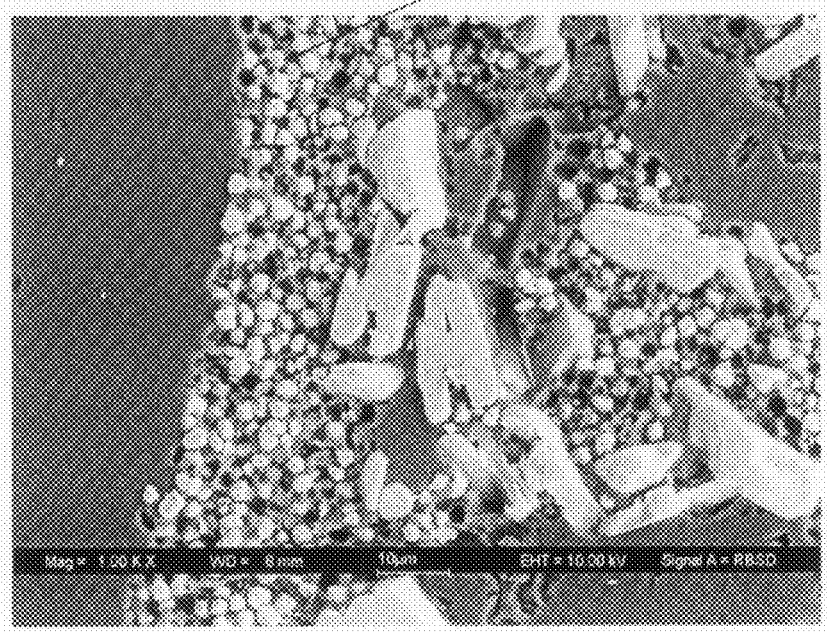

The flushed and dried monolith support was pretreated with skim milk (obtained from the grocery store under the name Great Value™) in the flow-coater illustrated in FIG. 9. Before pretreatment, the support was carefully wrapped with Teflon® (polytetrafluoroethylene) tape to prevent the pore-filling material (protein from skim milk) from directly contacting the exterior of the support. Upon soaking in the skim milk for 20 seconds, the support was unloaded and the Teflon tape was taken off. The modified support was dried for 23 hours at ambient conditions. Then, the modified support was mounted into the flow coater again and coated with the 30 wt. % alumina slip AA-3 used in the Comparative example. After drying at 120° C. and firing at 1400° C., the resulting alumina membrane was characterized using SEM. A smooth and uniform inorganic coating 30 was formed as shown in the top view of FIG. 3(a), with a coating thickness of 20 μm as shown in the cross-sectional view FIG. 3(b).

EXAMPLE 2

Deposition of Alpha-Alumina Membranes on Supports Modified with Protein from a Variety of Milk Solutions This example describes coating of an alumina membrane on a support modified with different milk solutions. The monolith support used in this example was made of alpha-alumina with an outer diameter of 8.7-9.2 mm and a length of approximately 150 mm comprising 19 rounded channels of average diameter of 0.75 mm being uniformly distributed over the cross-sectional area. The median pore size is 8.51 μm and porosity 45.6% as measured by mercury porosimetry. The support was flushed through the channels with D.I. water, then fully dried at 120° C. in an oven overnight.

Figure 4A:
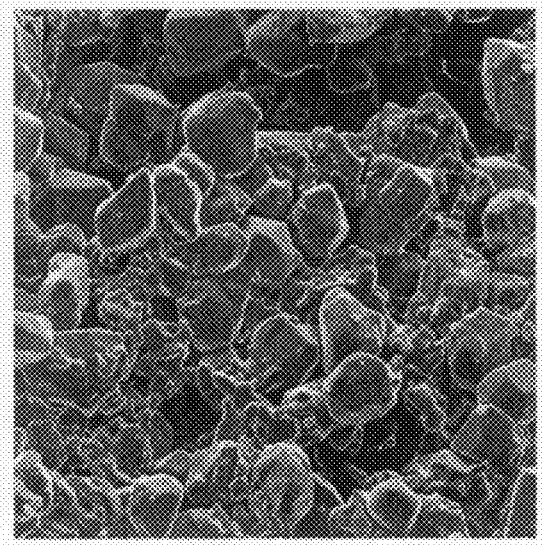
FIGS. 4a-4c are SEM images illustrating the surface morphologies of a bare monolith support (FIG. 4a), the support modified by application of skim milk (FIG. 4b), and the support modified by application of 2% milk (FIG. 4c).
Figure 4B:
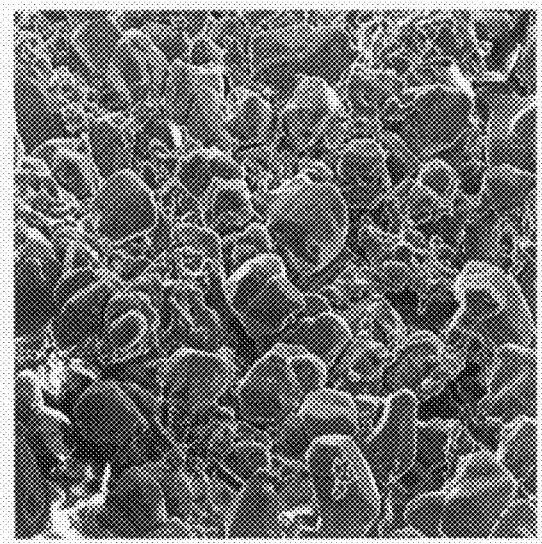
Figure 4C:
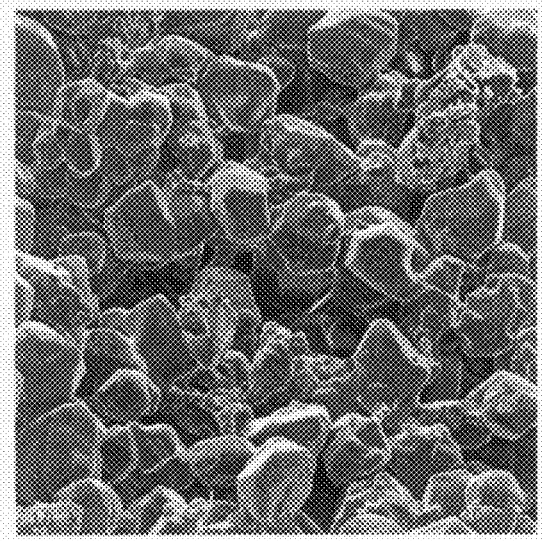

Three kinds of milk solutions were used for the modification of the support: diluted skim milk, skim milk (Great Value™), and 2% milk (Great Value™). The diluted skim milk was prepared by mixing 50 ml skim milk (Great Value™) with 100 ml D.I. water. The same flow-coater illustrated in FIG. 9 was used to modify the support with the different milk solutions. The soaking time was 20 seconds. The modified supports with Teflon tape removed were dried at ambient conditions for 23 hours. FIGS. 4a-4c show SEM images of surface morphology of the unmodified support (FIG. 4a) and the two modified supports with skim milk (FIG. 4b) and 2% milk (FIG. 4c). Large cavities on the support tend to be filled by the particles in the milk, while the surface alumina is left intact.

Figure 5A:
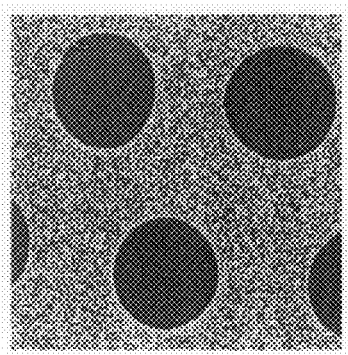
FIGS. 5a-5c are SEM images of alumina coatings in channels of a support having been modified by application of diluted skim milk (FIG. 5a), skim milk (FIG. 5b), and 2% milk (FIG. 5c).
Figure 5B:
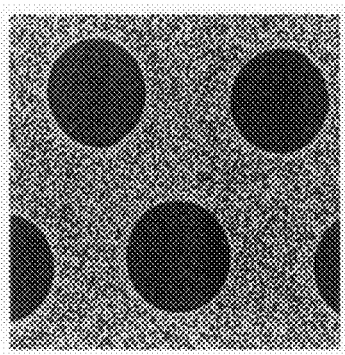
Figure 5C:
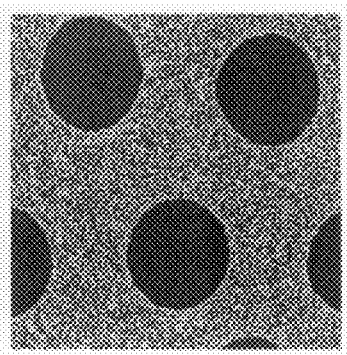
Figure 5D:
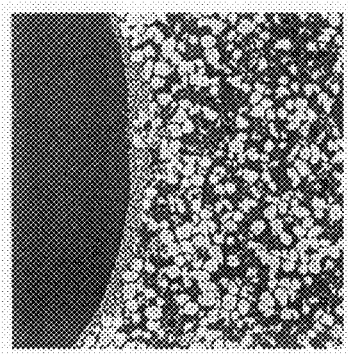
FIGS. 5d-5f are SEM images of higher magnification than FIGS. 5a-5c of the cross-section of the same alumina coatings on the support having been modified by application of diluted skim milk (FIG. 5d), skim milk (FIG. 5e), and 2% milk (FIG. 5f).
Figure 5E:
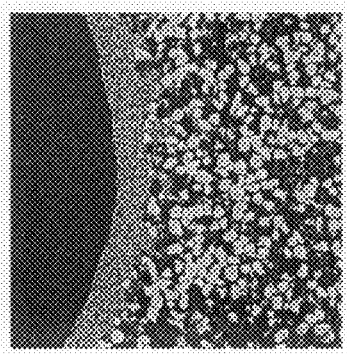
Figure 5F:
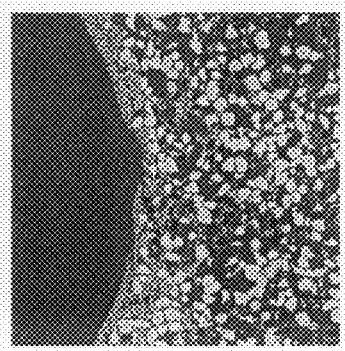
Figure 6A:
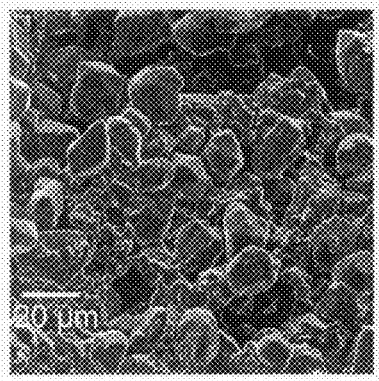
FIGS. 6a and 6b are SEM images of a bare support (FIG. 6a) and an alumina membrane coated on the support (FIG. 6b) according to an embodiment of the invention.
Figure 6B:
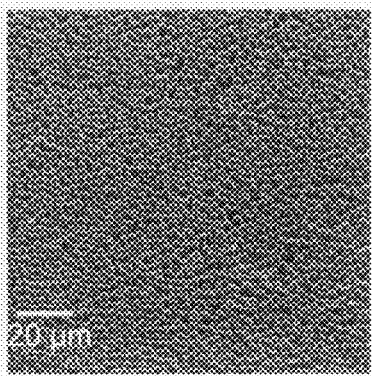

The dried supports were mounted into the flow coater again and coated with the 30 wt. % alumina slip AA-3 as used in the Comparative example. After dried at 120° C. and fired at 1400° C. for 2 hours, the resulting alumina membranes were characterized by SEM. FIGS. 5a-5f are SEM images of the alumina membranes deposited on supports that had been modified with the three different milk solutions. The membrane on the support modified with the diluted skim milk (FIGS. 5a, 5d) was thinner than that on the skim milk-modified support (FIGS. 5b, 5e). As shown in FIGS. 5c and 5f, the membrane coated on the 2% milk-modified support was less continuous and was rough compared to the other membranes. FIGS. 6a and 6b show the surface morphologies of the bare support (FIG. 6a) and alumina membrane (FIG. 6b) coated on the skim milk-modified support. Thus, different types of milk used to modify the support can vary certain characteristics of the deposited membrane.

EXAMPLE 3

Optimized Process for Deposition of Membranes Along the Radial Direction of the Support This example describes an optimized skim-milk pretreatment process for coating of a uniform alumina membrane along the radial direction on a monolith support. The same monolith support as in Example 2 was used. The support was flushed through the channels with D.I. water, then fully dried at 120° C. in an oven overnight.

The flushed and dried monolith support was pretreated with skim milk (Great Value™) using the same flow-coater as Examples 1 and 2. Before soaking, the exterior of the support was fully wrapped with Teflon tape. Upon soaking for 20 seconds, the support was unloaded and dried with wrapped Teflon tape remaining on the support and at ambient conditions for around 5 hours and then moved into a 60° C. oven and kept drying for 14 hours.

A slip with the solid concentration of 30 wt. %, but a higher PEG concentration (8 wt. %), was used in this example. First, 0.088 g of Tiron was added into a 150 ml plastic jar with 66.96 g D.I. water, to which 44 g alumina AA-3 powder was then added. Upon shaking for around 1 min, the jar was put into an ice bath and ultrasonicated 30 times with 10 sec ON and 30 sec OFF intervals. Next, the treated slip was mixed with 44.64 g 20 wt % PEG and 1.58 g 1% DCB. After ball-milling for 15-20 h, the slip was poured through a fine screen into a flask, followed by degassing with a vacuum pump.

Figure 7A:
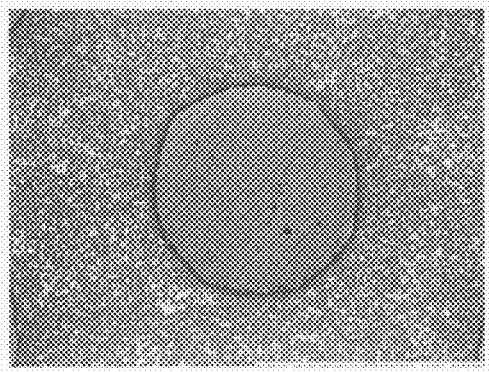
FIGS. 7a-7c are optical microscopic images providing cross-sectional illustrations of an alumina membrane coating in different channels of a monolith support, where the support had been modified with an optimized skim milk pretreatment process.
Figure 7B:
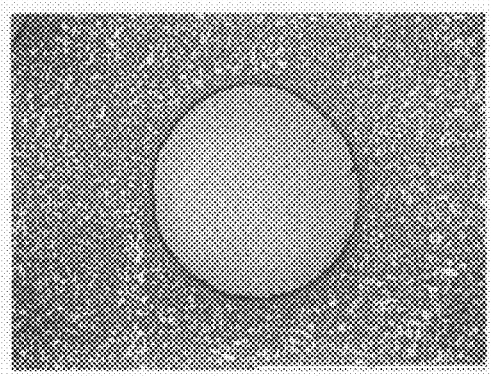
Figure 7C:
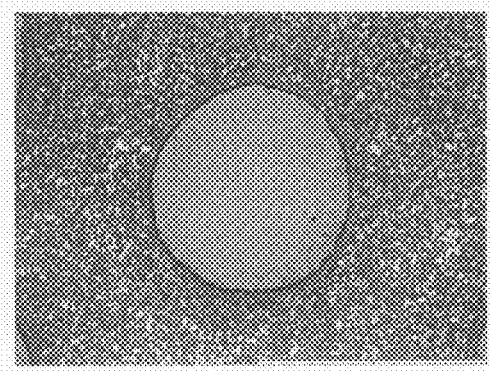

Then, the slip was used to coat the modified support with the same method as in the Comparative example. After drying at 120° C. and firing at 1400° C., the resulting alumina membrane was characterized by optical microscopy. A membrane with uniform thickness along the radial direction was formed as shown in FIGS. 7a-7c. The membrane thickness is around 30 μm. As shown in FIGS. 7a-7c in conjunction with FIG. 1, there is uniformity in the coatings for the center channel 12 (FIG. 7a), the middle channel 16 (FIG. 7b), and the edge channel 18 (FIG. 7c).

Figure 8A:
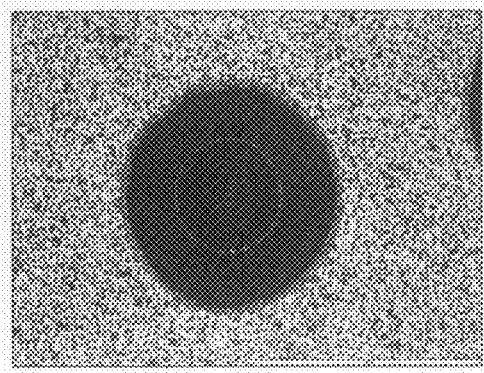
FIGS. 8a-8c are optical microscopic images providing cross-sectional illustrations of an alumina membrane coating in different channels of a monolith support, where the support had not been modified with an optimized skim milk pretreatment process.
Figure 8B:
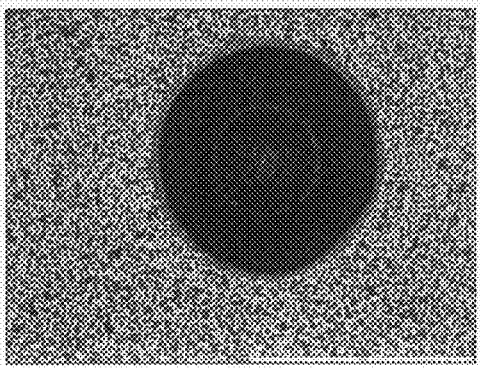
Figure 8C:
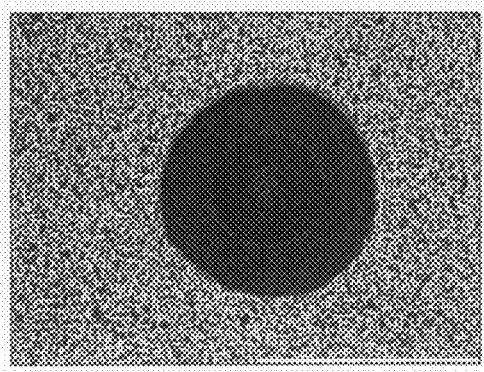

In comparison, the same support was pretreated with the same skim milk, but the Teflon tape was taken off during the whole drying process (5 hours at ambient conditions and 14 hours at 60° C.). The modified support was coated with the slip (30 wt % AA-3 and 4 wt % PEG) used as in the Comparative example. FIGS. 8a-8c illustrate that the membrane in the different channels along the radial direction is not as uniform. The alumina layer deposited in the center channel 12 (FIG. 8a) and middle channel 16 (FIG. 8b) are more uniform and thicker compared with that in edge channel 18 (FIG. 8c).

Unless otherwise indicated, all numbers such as those expressing weight percents of ingredients, dimensions, and values for certain physical properties used in the specification and claims are to be understood as being modified in all instances by the term "about." It should also be understood that the precise numerical values used in the specification and claims form additional embodiments of the invention. Efforts have been made to ensure the accuracy of the numerical values disclosed in the Examples. Any measured numerical value, however, can inherently contain certain errors resulting from the standard deviation found in its respective measuring technique.

Furthermore, as used herein, in describing and claiming the present invention, the use of the indefinite article "a" or "an" includes one or more of the recited elements and should not be limited to "only one" unless explicitly indicated to the contrary.

Also as used herein, a "wt %" or "weight percent" or "percent by weight" of a component, unless specifically stated to the contrary, is based on the total weight of the composition or article in which the component is included.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

We claim:

1. A method for preparing a porous inorganic coating on a porous support, which comprises:
   providing a porous support comprising a first end, a second end, and a plurality of inner channels having surfaces defined by porous walls and extending through the support from the first end to the second end;
   modifying the inner channel surfaces of the support by applying to the inner channel surfaces a composition comprising an organic pore-filling material comprising protein particles;
   applying to the modified inner channel surfaces a coating comprising inorganic particles; and
   heating the coated support to remove the organic pore-filling material, leaving the porous inorganic coating on the porous support.

2. The method of claim 1, wherein the provided porous support is in the form of a honeycomb monolith.

3. The method of claim 1, wherein the provided porous support is inorganic.

4. The method of claim 3, wherein the porous inorganic support is ceramic.

5. The method of claim 4, wherein the porous ceramic support comprises cordierite, alpha-alumina, mullite, aluminum titanate, titania, zirconia, ceria or combinations thereof.

6. The method of claim 1, wherein the inner channels of the provided support are circular and have an average diameter of from 0.5 to 2 mm.

7. The method of claim 1, wherein the pores of the porous walls of the provided support have a median pore size of 5 μm or greater.

8. The method of claim 1, wherein the composition comprising the protein particles comprises an aqueous suspension of the protein particles.

9. The method of claim 8, wherein the composition comprising the protein particles is skim milk.

10. The method of claim 1, wherein the organic pore-filling material further comprises starch particles.

11. The method of claim 10, wherein the starch particles comprise amaranth starch, quinoa starch, taro starch, or combinations thereof.

12. The method of claim 1, wherein the organic pore-filling material further comprises synthetic polymer particles.

13. The method of claim 12, wherein the synthetic polymer particles comprise polystyrene, polyacrylate, an oligomer, or combinations thereof.

14. The method of claim 1, wherein the organic pore-filling material comprises protein particles having a median particle size of from 0.1 to 3 μm.

15. The method of claim 1, which comprises applying the composition comprising the organic pore-filling material to the inner channel surfaces of the support by dip coating, flow coating, slip casting, immersion, or combinations thereof.

16. The method of claim 1, wherein the coating comprising inorganic particles comprises cordierite, alumina, mullite, aluminum titanate, titania, zirconia, or ceria particles, or combinations thereof.

17. The method of claim 1, wherein the coating comprising inorganic particles comprises inorganic particles having a median particle size of from 0.1 to 10 μm.

18. The method of claim 1, wherein the coating comprising inorganic particles is applied from a coating composition that further comprises a dispersant, a binder, an anti-cracking agent, an anti-foam agent, or combinations thereof.

19. The method of claim 1, which comprises applying the coating comprising inorganic particles to the modified inner channel surfaces by slip casting or flow coating.

20. The method of claim 1, which comprising firing the coated support to calcinate the organic pore-filling material, leaving the porous inorganic coating on the porous support.

21. The method of claim 1, which further comprises sintering the inorganic particles in the porous inorganic coating.

22. The method of claim 21, wherein the sintered porous inorganic coating has a thickness of from 1 to 25 μm throughout the length of the inner channels.

23. The method of claim 22, wherein the inner channels have a length of 80 mm or more.

24. The method of claim 21, wherein the sintered inorganic coating has a median pore size of from 0.1 to 2 μm.

* * * * *